FIG. 1

KARL A. KAIL
INVENTOR.

FIG. 2

KARL A. KAIL
INVENTOR.

July 20, 1948.　　　K. A. KAIL　　　2,445,673
MAGNETIC COMPASS INDICATING SYSTEM FOR
AVIATION TRAINERS
Filed July 30, 1943　　　　　　　　　4 Sheets-Sheet 3

FIG. 3

KARL A. KAIL
*INVENTOR.*

BY

ATTORNEYS.

FIG. 4

KARL A. KAIL
INVENTOR.

BY
ATTORNEYS.

Patented July 20, 1948

2,445,673

UNITED STATES PATENT OFFICE 2,445,673

MAGNETIC COMPASS INDICATING SYSTEM FOR AVIATION TRAINERS

Karl A. Kail, Montrose, Pa., assignor to Link Aviation, Inc., Binghamton, N. Y., a corporation of New York Application July 30, 1943, Serial No. 496,738

7 Claims. (Cl. 35—10)

My invention relates to trainers for aviators and comprises means for improving in a grounded aviation trainer means for simulating the functioning of certain of the instruments in such a trainer.

A general object of my invention is to improve the functioning of the magnetic compass in a grounded aviation trainer.

Another object of my invention is to provide means whereby any variation may be introduced into the compass of such a trainer whereby the functioning of the compass in a real plane at any point upon the earth's surface may be simulated.

Another object of my invention is to provide a compass system for a grounded aviation trainer which is completely independent of the earth's magnetic field, and to provide in such a system means whereby any variation may be introduced into the system.

In order that the following description may be more readily understood reference is made to the accompanying figures wherein.

Figure 1:
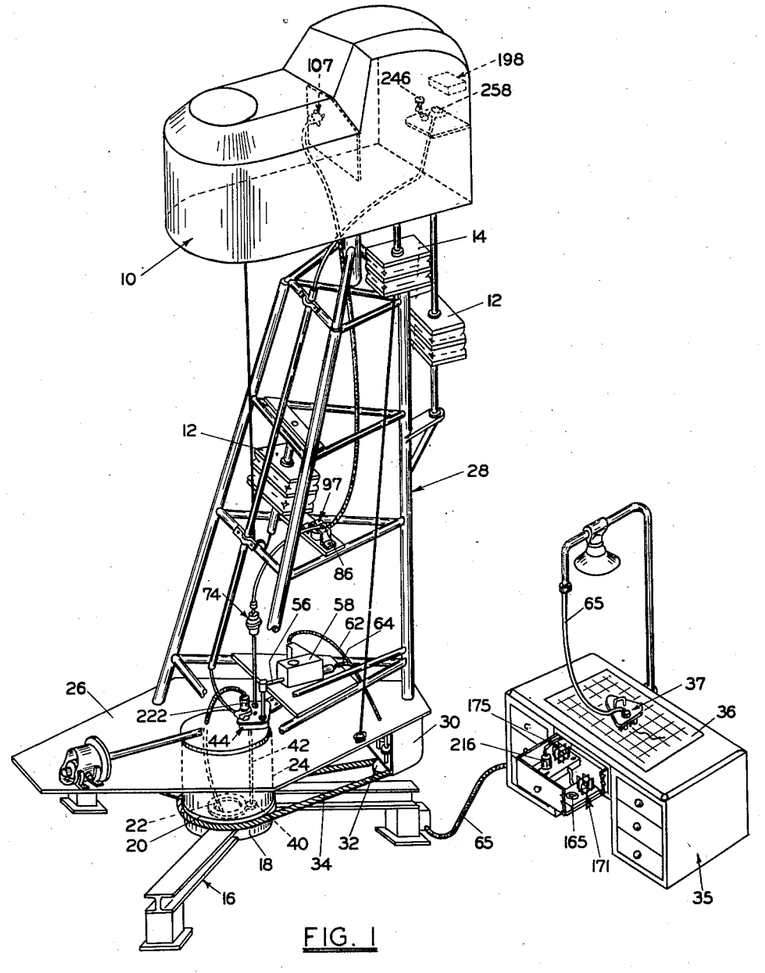
Fig. 1 shows a general view of the trainer and instrument system which my present invention comprises.

Reference is now made to Fig. 1 which shows a trainer of the type disclosed in U. S. Patents 1,825,462 and 2,099,857. These trainers, which are of the type manufactured by Link Aviation Devices, Inc., Binghamton, New York, comprise a fuselage 10 which is mounted upon a universal joint (not shown) positioned near the central part of the floor of the fuselage. A pair of bellows 12 known as the elevator bellows are provided and through a system of vacuum, valves and linkages these bellows may be made to pitch fuselage 10 in simulation of the climbing and diving of a plane in actual flight. A second pair of bellows, known as the aileron bellows, are used to bank the fuselage 10 laterally in simulation of the banking of a plane in actual flight. Only one of these aileron bellows is shown and it is designated 14. Still referring to Fig. 1, it will be seen that a triangular base 16 is provided, and rigidly attached thereto is a lower bearing housing 18. Formed integrally with the upper end of this bearing housing is an exterior annular groove 20. Inside lower bearing housing 18 and rigidly affixed thereto is ring gear 22. Base 16, lower housing 18, annular groove 20 and ring gear 22 are fixed in relation to the floor upon which base 16 rests. Upper bearing housing 24 is rotatably mounted with respect to lower housing 18 by means of a suitable bearing arrangement and rigidly attached to housing 24 is platform 26 upon which rests the triangular tower 28 which holds the fuselage 10 and other associated apparatus. Rigidly affixed to and depending from platform 26 is turning motor 30 which has an output shaft upon which is rigidly affixed a wheel 32 which also is grooved. Turning belt 34, it will be noticed, wraps around groove 20 integral with fixed lower bearing housing 18 as well as around the output wheel 32 of turning motor 30. Whenever the student in the trainer presses one of the rudder pedals (not shown) therein, turning motor 30 is actuated and the output wheel 32 rotates in a direction dependent upon which rudder pedal is pressed. The friction between groove 20 and belt 34 on the one hand, and wheel 32 and belt 34 on the other, is sufficiently great to prevent slipping therebetween, and consequently, wheel 32 travels along belt 34 causing motor 30, platform 26, tower 28, fuselage 10 and upper bearing housing 24 to rotate in simulation of the turning of a plane in actual flight.

Also seen in Fig. 1 is an operator's desk 35 which has placed thereupon a map 36 over which recorder 37 travels. A detailed description of recorder 37 may be found in U. S. Patent 2,179,663, and as there disclosed it moves forward over the map or chart 36 to simulate the forward travel of the trainer, and whenever the trainer fuselage 10 is turned the recorder 37 turns its direction of travel on the map. The recorder also has an inking wheel (not shown) which makes a line along the map as the recorder travels over it. By a reference to the position of the inking wheel upon the map 36 the operator may determine the exact simulated location of the trainer.

All of the foregoing apparatus forms no part of my instant invention except when combined with features to be later described, and therefore, a more detailed description is omitted, but for a thorough explanation thereof reference is made to the above-mentioned United States patents.

Magnetic compass system

In a plane in flight one of the most relied upon instruments is the magnetic compass which, as is commonly known, comprises a magnetized bar which, when freely suspended, has its longitudinal axis parallel to the lines of force of the earth's magnetic field. Inasmuch as the real North Pole and the magnetic North Pole are not at the same place, in most localities the compass does not point toward true north because the direction from most points upon the earth's surface to the true North Pole differs from the direction of the magnetic North Pole. The angular difference between the directions of true north and magnetic north at any place is known in navigation as the magnetic variation of the place and is called westerly variation or easterly variation, depending upon whether magnetic north lies to the west or east of true north.

In actual flight, the pilot or navigator, knowing the general vicinity of the plane, by applying the magnetic variation for that vicinity, as determined from well-known charts, to the compass reading can ascertain the true heading of the plane. Over flights of any considerable distance this magnetic variation usually varies and the pilot or navigator must apply the different variations as the plane makes progress in its flight.

Trainers of the type being considered are relatively fixed at a given point upon the earth's surface and even though they are fixed, flights over considerable distances as before mentioned may be simulated therein. In order that the exact conditions which would occur in actual flight may be reproduced in such a trainer it is clear that means should be provided for simulating the various magnetic variations to which the compass in a plane actually making the simulated flight would be responsive. If the compass were merely installed in the trainer, it is clear that although the compass would respond to the turning of the trainer the variation component would be constant and equal to the variation of the locality where the trainer is erected. The following means may be used in order to introduce different variations into the compass in the trainer as the simulated position of the trainer determined by a reference to the recorder 37 upon the map 36 changes, even though the trainer actually makes no forward progress. The student navigator, knowing the approximate assumed geographical location of the trainer will therefore be forced to resort to his charts to determine what the variation would be if a plane were actually flying at the point where the trainer is assumed to be, and then he must apply this variation to the reading of the compass in the trainer in order to determine the true assumed heading of the trainer.

Figure 2:
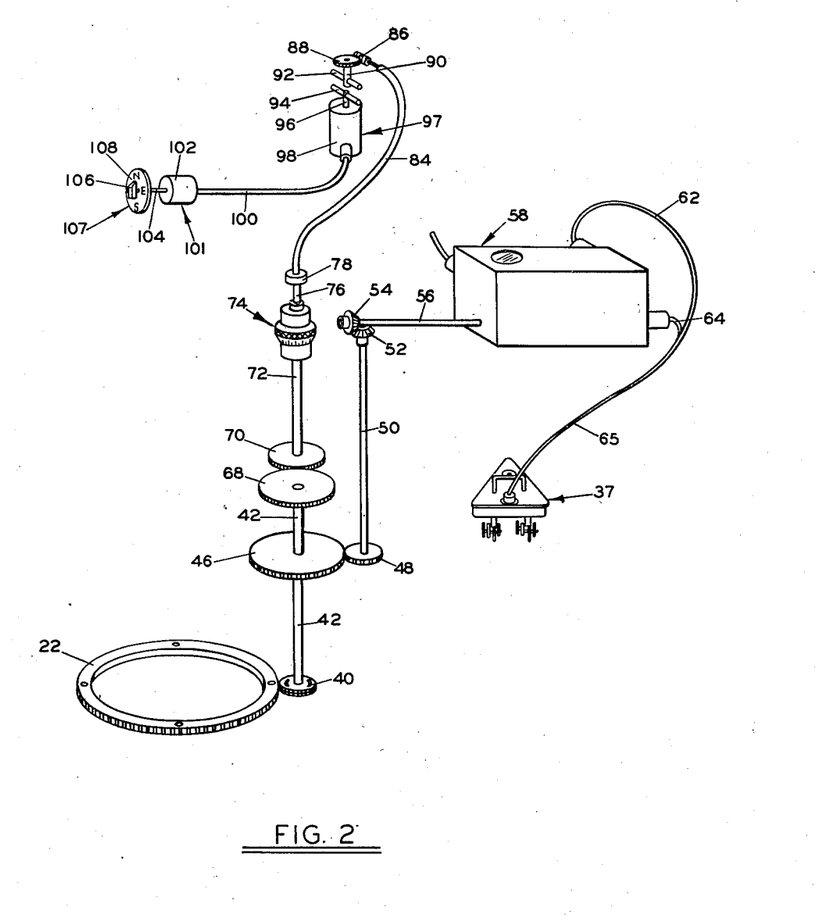
Fig. 2 is a diagrammatic view of the instrument system of this invention.

Reference is made to Figs. 1 and 2. It has been mentioned that the ring gear 22 is rigidly affixed to lower gear housing 18 and therefore does not rotate as the platform 26, tower 28 and fuselage 10 rotate. Meshing with gear 22 is an antibacklash gear 40 which is rigidly affixed to the lower end of vertical shaft 42. In Fig. 1, it will be seen that this vertical shaft enters a boxlike structure 44 which is referred to in the art as the heading gear box. The mechanism contained in this gear box is enclosed in dotted lines in Fig. 2. It will be seen that inside the heading gear box 44 and fixed upon vertical shaft 42 is a gear 46 which meshes with a smaller gear 48. This last-mentioned gear is fixed upon a second vertical shaft 50 which has rigidly mounted upon its upper end bevel gear 52 which meshes with a second bevel gear 54 affixed to a horizontal shaft 56. The right end of this last-mentioned shaft enters another boxlike structure 58 which represents the wind drift instrument which is described in detail in the copending application of Gunne Lowkrantz and myself, Serial No. 406,056 filed August 8, 1941. It is to be noted that the recorder 37 is connected to the wind drift instrument 58 by means of electrical connections 62 and 64 which are carried by a single cable 65. The wind drift instrument as explained in the mentioned copending application provides means for making the speed of the recorder 37 responsive to the changing assumed ground speeds of the trainer.

Referring again to Fig. 2, it will be seen that rigidly affixed upon the upper end of shaft 42 is a gear 68. This gear is in mesh with gear 70 which is likewise fixed upon the lower end of a third vertical shaft 72. My variation setting mechanism is designated generally in this figure by 74 and it will be seen that a fourth shaft 76 is mounted in the upper end thereof. The upper end of this shaft enters flexible shaft connector 78 where the rotation of shaft 76 is transferred to flexible shaft 84. To the upper end of flexible shafting 84 is fixed worm 86 which engages worm gear 88. A vertical shaft 90 is fixedly attached to worm gear 88 and holds bar magnet 92 which is affixed to the lower end of shaft 90. Disposed below bar magnet 92 is a second bar magnet 94 which is mounted upon the input shaft 96 of a transmitting "magnesyn," designated generally by 97, the housing of which is designated as 98. Suitable electrical connections 100 extend from the transmitting "magnesyn" to the receiving "magnesyn" designated generally by 101 and having a housing 102 and an output shaft 104 upon which is rigidly affixed pointer 106 which moves over dial 108 which is marked in the conventional compass dial manner. Pointer 106 and dial 108 form a simulated remote indicating compass designated by 107, and, as seen in Fig. 1, is located upon the instrument panel in fuselage 10. Transmitting "magnesyn" 97, receiving "magnesyn" 101 and compass 107 associated with the receiving "magnesyn" provide a combination well known in the art of aviation. Whenever input shaft 96 of the transmitting "magnesyn" 97 is rotated through a given angle with respect to its housing 98 the output shaft 104 of the receiving "magnesyn" rotates through the same angle and in a given direction with respect to its housing 102, the direction of the rotation being dependent upon the particular wiring circuit employed. It should be particularly noticed that the position of the magnetic bar 94 attached to input shaft 96 is independent of the earth's magnetic field and is governed solely by the position of bar magnet 92.

As seen in Fig. 1, when the trainer rotates the heading gear box 44 rotates with platform 26 and inasmuch as gear 22 is stationary, gear 40 will, as it moves around gear 22, rotate vertical shaft 42 and gear 68 which will then cause gear 70 and vertical shaft 72 to rotate. A detailed description of variation control 74 will be hereinafter given, it being sufficient at this point to state that when in operation, a rotation of shaft 72 causes variation control 74 to rotate and shaft 76 is also rotated. This rotation is transferred to flexible shaft 84 by connector 78 and worm 86 is turned which drives the worm gear 88. Depending shaft 90 is rotated with worm gear 88 and, therefore, the position of permanent bar magnet 92 is changed.

If bar magnet 92 were not moved by the rotation of the trainer through the aforedescribed system it will be understood that inasmuch as it is attached to the trainer fuselage its rotation would be equal to and in the same direction as the rotation of the fuselage. However, the above-mentioned gears and associated parts comprise such ratios and directions of response to the movements of the trainer that when the trainer is rotated bar magnet 92 is rotated by these gears and associated parts through an angle equal to and in the opposite direction of the rotation of the fuselage, and therefore, bar magnet 92 remains fixed in its position relative to the base 16 of the trainer. The rotation of bar magnet 92 caused in the first instance by a rotation of the trainer is overcome by the take-off system being described.

Inasmuch as bar magnet 94 is controlled by magnet 92 it will be realized that it, too, remains fixed even though the fuselage is rotated. However, "magnesyn" transmitter housing 98 rotates with the trainer fuselage, and therefore, there is a relative angular movement between the housing 98 and its input shaft 96 equal to the angle through which the trainer fuselage is rotated. The output shaft 104 of the receiving "magnesyn" is therefore rotated through an angle equal to the angle through which the trainer fuselage is rotated, and pointer 106 moves across dial 108 through an equal angle. The new assumed heading of the trainer is therefore shown by compass 107, except, of course, for the variation which has been previously set into the system by the operator, as will hereinafter be described.

Figure 3:
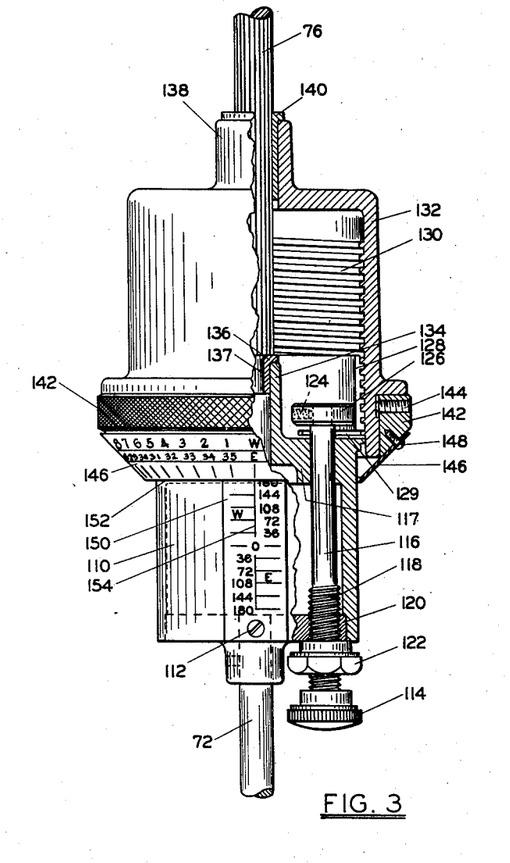
Fig. 3 is a detailed view of the magnetic compass variation control.

Reference is now made to Fig. 3 which shows the detailed construction of variation control designated in Fig. 2 by 74. It will be seen in Fig. 2 that vertical shaft 72, to which reference has been previously made, enters the lower housing 110 of the variation control and is attached thereto by means of a set screw 112 so that shaft 72 and lower housing 110 always rotate together. Locking knob 114 is integrally formed with a vertical shaft 116 which has a lower threaded portion 118 which cooperates with a threaded portion in the lower end 120 of the housing 110. A lock nut 122 is also provided. Shaft 116 passes through shoulder 117 integral with lower housing 110 and rigidly affixed to the upper end of shaft 116 by means of a set screw 124 is an eccentric cam 126. An L slot 129 is cut in the portion 128 of the housing 110 adjacent eccentric cam 126 so that by means of locking knob 114 cam 126 may be used to lock the threaded portion 128 of housing 110 with the threaded portion 130 of upper housing 132. Formed integrally with shoulder 117 of lower housing 110 is a centrally disposed hollow member 134 which receives an oilite bearing 136 pressed upon the lower turned down end 137 of shaft 76. It is to be noticed that shaft 76 just above the turned down end is splined and the uppermost part 138 of housing 132 contains a bearing 140 which is adapted to receive splined lower end of shaft 76. A knurled ring 142 is affixed to the lower end of upper housing 132 by means of set screws 144 and a graduated scale 146 is affixed to knurled portion 142 by means of set screws 148. A second graduated scale 150 is affixed to the outer lower end of lower housing 110. This scale, it will be noticed, is graduated from zero in increments of 36 through 180° in both directions from the zero mark while scale 146 has two series of graduations, the upper one reading from zero through 36 in a counterclockwise direction and the lower one graduated from zero to 36 clockwise. One complete rotation of upper housing 132 moves the lower edge 152 of upper housing up or down scale 150, depending upon the direction of rotation, the distance between any two adjacent horizontal marks on scale 150. The upper series of graduations on both scales are used when it is desired to set a westerly variation into the compass system being described while the lower series is used in the event that the assumed variation is easterly.

With the previously described apparatus, it should be understood that a rotation of knurled portion 142 to the right as seen in Fig. 3 or clockwise as seen from below will cause a rotation of scale 146 and of upper housing 132. Lower housing 110 with its threaded portion 128 remains stationary while upper housing 132, by the coaction of threaded elements 128 and 130, will move upwardly as shown in Fig. 3. Such a movement rotates splined shaft 76 and flexible cable 84, worm 86, worm gear 88 and permanent bar magnet 92. Magnet 94 will follow magnet 92 and compass pointer 106 will be moved counterclockwise as seen in Fig. 2, indicating a westerly variation. The knurled portion 142 may be moved the correct amount to set in the desired variation by a reference to the upper series of graduations on scale 146, viz., those on the scale marked W. When the lower edge 152 of scale 146 is exactly across the graduations upon either side of the zero mark of scale 150 and the letter W is exactly above the vertical line 154 on scale 150, no variation easterly or westerly is introduced into the system. If the knurled portion 142 is rotated clockwise so that the numeral 5 on the W scale is immediately above vertical line 154 and the upper numeral 36 on scale 150 is not visible, 5° of westerly variation have been introduced into the system and the compass pointer 106 is moved 5° counterclockwise of the position it would occupy if no variation were introduced into the system. If the numeral 5 were above vertical line 154 and the number 72 were visible but 108 was not visible, 77° westerly variation would be set into the system. In this manner, any desired westerly variation may be introduced into the compass indication and by turning knurled portion 142 counterclockwise and making corresponding readings any desired easterly variation may be introduced. In the event an easterly variation is introduced the compass needle 106 will of course be moved clockwise across compass rose 108, the angular movement being dependent upon the magnitude in degrees of the variation introduced.

While the operator is setting the desired variations into the system lock nut 122 must be screwed down toward locking knob 114 and locking knob 114 is rotated until cam 126 does not bear against the inside of the upper threaded portion 128 of housing 110. Upper housing 132 may then be rotated to introduce the desired variation into the system, and then locking knob 114 is rotated until cam 126 again locks the threaded portions 128 and 130 to prevent relative rotation therebetween and the locking nut 122 is screwed tight. As previously stated, when locking piece 114 is so placed the rotation of shaft 72 caused by the rotation of the trainer rotates lower housing 110 which, because of the locking action of cam 126, rotates upper housing 132 which in turn rotates splined shaft 76, and the parts shown in Fig. 2 connected to the upper end of this shaft.

In order that my aforedescribed compass may be properly synchronized, the trainer is placed on an assumed easterly heading. Locking knob 114 is turned to disengage cam 126 from the inside of the threaded portion 128 of lower housing 110 and by means of knurled portion 142 upper housing 132 is rotated until the letters W and E on scale 146 are directly above vertical line 154 of scale 150 and the lower edge 152 of scale 146 is exactly above the horizontal lines upon either side of the zero on scale 150. Locking knob 114 is turned until cam 126 presses against portion 128 of housing 110 and the lock nut 122 is tightened. Flexible shafting 84 is then disengaged from worm 86 and bar magnet 92 is rotated until the compass pointer 106 is at 90° or indicates a due east heading. Flexible shafting 84 is then reengaged with worm 86. The trainer is then assumed to be flying due east and the compass indicates a due east heading. Thereafter, if the trainer turns clockwise a given number of degrees, as toward the south, by means of my described system the compass needle 106 turns the same number of degrees clockwise, thus indicating the new assumed heading of the trainer. Of course an opposite turning of the trainer turns the compass needle 106 counterclockwise through the same number of degrees as the turning of the trainer, and compass 107 indicates the new assumed heading of the trainer.

Let us assume that a flight is to be practiced from Binghamton, New York, having a westerly variation of approximately 10° to San Francisco, California, where the variation is approximately 18° east. The assumed trainer heading and compass indications are synchronized as previously stated. By means of locking knob 114 the two housings 110 and 132 are unlocked, upper housing 132 is rotated clockwise as seen from below until the numeral 10 of the upper series of numerals on scale 146 is immediately above the vertical line 154 of scale 150. The upper number 36 on scale 150 should not be visible. The compass will then read 100° when the trainer is on a due east heading just as the compass in a real plane at Binghamton, New York, reads 100° when the plane is heading due east. As the trainer is rotated by the student to fly westwardly the westerly variation of 10° will be maintained. The student in the trainer desiring, let us say, to fly due west, by a reference to his chart will learn that the variation at Binghamton is 10°, and therefore to fly a true heading of 270° he must fly the trainer at an assumed compass heading of 280°, and he will do so. As the recorder 37 travels over map 36 toward the upper left in Fig. 1, indicating an assumed westwardly travel of the trainer, the instructor, by referring to his chart of magnetic variations in the United States will change the setting of upper housing 132 with respect to lower housing 110 in order that the correct variation for the assumed position of the trainer at any time will be introduced into the system. As the recorder shows that the trainer is assumed to be near South Bend, Indiana, where the variation is zero, the variation as set in by variation control 74 should be reduced to zero and as the trainer continues its simulated westward flight an easterly variation is introduced until when the recorder shows that the trainer is at San Francisco an easterly variation of 18° has been introduced into the system. The navigator in the trainer, knowing the approximate assumed location of the trainer throughout the whole "flight" because he has "navigated" the trainer across the country will by a reference to his magnetic variation chart determine at what reading of the compass the trainer should be "flown," exactly as though he were navigating a plane actually taking the simulated flight.

It will be seen, therefore, that by means of my invention the magnetic variation of a compass in a plane at any place upon the earth's surface may be introduced into a compass in a grounded aviation trainer, thereby requiring the same corrections to be made by the student navigator in the trainer as he would have to make if he were actually flying at the point where the trainer is assumed to be.

Figure 4:
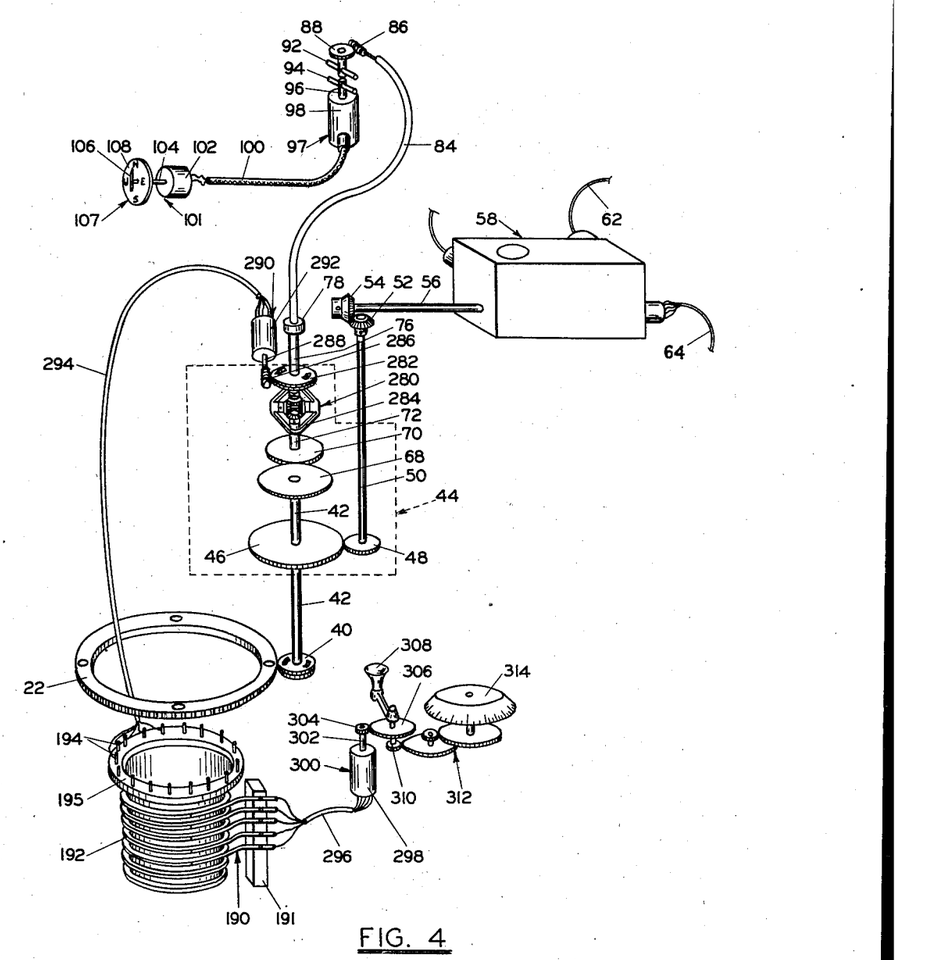
Fig. 4 shows an alternate system for introducing the desired variation into the compass system.

Reference is now made to Fig. 4 which shows another embodiment of my invention which provides means for introducing into the reading of the simulated magnetic compass in the trainer the magnetic variation of the assumed geographical location of the trainer upon the earth's surface. It will be seen in that figure that there is provided in place of variation control mechanism designated generally by 74 in Fig. 2 a differential designated generally by 280. As seen in Fig. 4, the primary input shaft of this differential is the shaft 72 which has been previously described and the output of the differential is the previously-described shaft 76. It will be readily understood that a rotation of the trainer fuselage 10 causes a rotation of the input shaft 72 and of the output shaft 76 and, therefore, pointer 106 moves across dial 108 in the same direction as the turning of the trainer and, therefore, by means of compass 107 the compass heading of the trainer may be ascertained by the student navigator.

Also seen in Fig. 4 is the secondary drive 282 of the variation differential 280, this secondary drive being rigidly affixed to the yoke 284 of differential 280 and taking the form of an antibacklash worm gear. Worm 286 is formed integrally with the output shaft 288 of variation Selsyn-type receiver designated generally by 290. The housing of this receiver is numbered 292 and is connected by means of wires contained in cable 294 to a plurality of the pins 194 each of which is electrically connected to one of the slip rings designated generally by 192. Each of the brushes 190 carried by brush block 191 which is held stationary inside lower bearing housing 18 contacts one of these slip rings and is connected by means of wires contained in cable 296 to the housing 298 of variation Selsyn-type transmitter designated generally by 300. The input shaft of this transmitter is designated by 302 and has rigidly affixed thereupon a spur gear 304 which meshes with a larger spur gear 306 which is turned by variation crank 308. Whenever crank 308 is turned spur gear 310 is likewise moved as is the gear train designated generally by 312 which rotates variation control scale 314. This variation control scale is graduated from zero through 180 in both directions and a suitable index mark (not shown) is provided for cooperation therewith.

Variation transmitter 300, variation receiver 290 and the previously-described electrical connections therebetween comprise a well-known system whereby a rotation of the input shaft 302 through a given angle rotates the output shaft 288 of the receiver 292 through an equal angle and in the desired direction, the direction of rotation being dependent upon the specific arrangement of wiring employed. It will be understood, therefore, that a rotation of variation control crank 308 rotates the input shaft 302 of the transmitter 300, the output shaft 288 of the receiver 290 is likewise rotated and worm gear 282 is turned, thereby causing a rotation of the yoke 284 of the differential 280 and of the output shaft 76 of this differential. Flexible shafting 84 is therefore rotated as is worm 86 and worm gear 88 which of course results in a movement of bar magnet 92. Bar magnet 94 will likewise be turned and, as previously described, the pointer 106 will move over dial 108.

The same rotation of variation control crank 308 which moves pointer 106 simultaneously moves variation scale 314 so that the operator may know the amount of movement imparted to the compass needle 106 by the rotation of variation control 308.

When the instant embodiment of my invention is employed the system is synchronized in the following manner:

The trainer is placed upon an assumed easterly heading, flexible shafting 84 is disengaged from worm 86 and bar magnet 92 is rotated until the compass pointer 106 is at 90° or indicates a due east heading. Flexible shaft 84 is then reengaged with worm 86. Gear 304 is then disengaged from gear 306 and variation crank 308 is rotated until the zero mark on variation scale 314 is exactly opposite the index mark (not shown). Gear 304 is then reengaged with gear 306.

These steps having been taken, the trainer is then on an assumed easterly heading or heading of 90° and inasmuch as no assumed variation is set into the system the pointer 106 properly points at 90° or due east. Thereafter a rotation of the trainer a given number of degrees, as toward the south, turns compass needle 106 through the same number of degrees clockwise and of course an opposite turning of the trainer likewise correctly turns the needle 106 through the same number of degrees as the turning of the trainer except that in this instance the turning of the needle 106 will be counterclockwise. It will be readily understood that by means of variation control crank 308 pointer 106 may be moved through the exact required number of degrees by a reference to the variation scale 314 and index mark and, therefore, the indication of compass 107 will vary from the assumed heading of the trainer by the amount of the variation introduced into the system. The student in the trainer will then be forced to take this variation into account in properly heading the trainer.

When the embodiment of my variation system now being considered is used, variation control crank 308 and variation scale 314 are preferably located at the desk 35. This arrangement provides a more convenient means for the operator for setting the correct variation into the compass system.

It will be realized, therefore, that my previously disclosed systems provide means whereby the operator may introduce into the compass system in a grounded aviation trainer a variation equal to the variation of the geographical position where the trainer is assumed to be flying. The student in the trainer must make proper correction for this variation, if he is to fly his assumed course, just as the pilot in a real plane must correct for variation in order to fly his desired course.

In Fig. 1 the numbers 165, 171, 175, 216 and 222 refer to elements described in detail in my application Serial No. 540,977 filed June 19, 1944, for Radio direction finding means for aviation trainer, which application is a division of this application.

The foregoing being but a preferred embodiment of my invention numerous details may be made in the construction thereof without departing from the substance of the invention.

I claim:

1. In a grounded aviation trainer the combination of a fuselage rotatable about a vertical axis, a simulated magnetic compass indicator in member rotatable with said fuselage, said con- said fuselage, a control element carried by a trol element determining the reading of said simulated compass indicator, means for preventing a rotation of said control element whenever said fuselage is rotated, and additional operable means for changing the position of said control element.

2. In a grounded aviation trainer the combination of a fuselage rotatable about a vertical axis, a simulated magnetic compass indicator in said fuselage, a magnet carried by a member rotatable with said fuselage, said magnet determining the reading of said simulated compass indicator, means for preventing a rotation of said magnet whenever said fuselage is rotated, and additional operable means for changing the position of said magnet.

3. In a grounded aviation trainer the combination of a fuselage rotatably mounted upon a stationary base, a simulated magnetic compass indicator in said fuselage, a control element carried by a member rotatable with said fuselage, said control element determining the reading of said simulated compass indicator, means operated by the rotation of said fuselage with respect to the stationary base for preventing a rotation of said control element whenever said fuselage is rotated, and additional operable means for changing the position of said control element.

4. In a grounded aviation training device of the type comprising a fuselage rotatably mounted upon a stationary base, a system for simulating the operation of a real magnetic compass in a plane, said system comprising, in combination, a simulated magnetic compass indicator located inside said fuselage and including a graduated dial and an index element, one of said two last-mentioned parts being movable relative to the other, take-off means operated by the rotation of said fuselage relative to said stationary base and operatively connected to the movable part of said indicator for changing the relative positions of said dial and index element, and additional means connected to the movable part of said indicator for changing the relative positions of said dial and index element.

5. In a grounded aviation training device of the type comprising a fuselage rotatably mounted upon a stationary base, a system for simulating the operation of a real magnetic compass in a plane, said system comprising, in combination, a simulated magnetic compass indicator located inside said fuselage and including a graduated dial and an index element, one of said two last-mentioned parts being movable relative to the other, take-off means operated by the rotation of said fuselage relative to said stationary base and operatively connected to the movable part of said indicator for changing the relative positions of said dial and index element, and additional means comprising a manually operable member and an associated graduated scale both located outside said fuselage for changing the relative positions of said dial and index element according to the magnetic variation at the assumed geographical location of said trainer.

6. In a grounded aviation training device of the type comprising a fuselage rotatably mounted upon a stationary base, a system for simulating the operation of a real magnetic compass in a plane, said system comprising, in combination, a simulated magnetic compass indicator located inside said fuselage, and including a graduated scale and index element, one of said two last-mentioned parts being movable relative to the other, an electrical transmitting system including a transmitter and a receiver, said receiver being responsive to the operation of said transmitter and also connected to the movable part of said indicator, take-off means operated by the rotation of said fuselage relative to said stationary base and operatively connected to said transmitter for operating the same in response to a rotation of said fuselage relative to said stationary base, and additional movable means connected to said transmitter for operating the same.

7. In a grounded aviation training device of the type comprising a fuselage rotatably mounted upon a stationary base, a system for simulating the operation of a real magnetic compass in a plane, said system comprising, in combination, a simulated magnetic compass indicator located inside said fuselage and including a graduated scale and index element, one of said two last-mentioned parts being movable relative to the other, an electrical transmitting system including a transmitter and a receiver, said receiver being responsive to the operation of said transmitter and also connected to the movable part of said indicator, take-off means operated by the rotation of said fuselage relative to said stationary base and operatively connected to said transmitter for operating the same in response to a rotation of said fuselage relative to said stationary base, and additional means comprising a manually operable member and an associated graduated scale both located outside said fuselage, said manually operable member being operatively connected to said transmitter for operating the same, whereby the relative positions of said dial and index element may be altered according to the magnetic variation of the assumed geographical location of said trainer.

KARL A. KAIL.

REFERENCES CITED

The following references are of record in the file of this patent:

UNITED STATES PATENTS

| Number | Name | Date |
| --- | --- | --- |
| 1,825,462 | Link | Sept. 29, 1931 |
| 1,974,220 | Sperry | Sept. 18, 1934 |
| 1,975,442 | Allen | Oct. 2, 1934 |
| 2,099,857 | Link | Nov. 23, 1937 |
| 2,164,412 | Koster | July 4, 1939 |
| 2,321,799 | Cone | June 15, 1943 |
| 2,326,764 | Crane | Aug. 17, 1943 |
| 2,326,766 | Delareuelle | Aug. 17, 1943 |

FOREIGN PATENTS

| Number | Country | Date |
| --- | --- | --- |
| 396,537 | Great Britain | 1933 |
| 396,538 | Great Britain | 1933 |

Certificate of Correction

Patent No. 2,445,673.

July 20, 1948.

KARL A. KAIL

It is hereby certified that error appears in the printed specification of the above numbered patent requiring correction as follows:

Column 10, lines 7 and 8, claim 1, strike out "member rotatable with said fuselage, said con- said fuselage, a control element carried by a" and insert instead *said fuselage, a control element carried by a member rotatable with said fuselage, said con-*; and that the said Letters Patent should be read with this correction therein that the same may conform to the record of the case in the Patent Office.

Signed and sealed this 25th day of January, A. D. 1949.

[SEAL]

THOMAS F. MURPHY,
*Assistant Commissioner of Patents.*